United States Patent
Mannby

(10) Patent No.: US 10,699,074 B2
(45) Date of Patent: *Jun. 30, 2020

(54) PHRASE-LEVEL ABBREVIATED TEXT ENTRY AND TRANSLATION

(71) Applicant: Microsoft Technology Licensing, LLC, Redmond, WA (US)

(72) Inventor: Claes-Fredrik Urban Mannby, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/986,473

(22) Filed: May 22, 2018

(65) Prior Publication Data

US 2019/0361975 A1    Nov. 28, 2019

(51) Int. Cl.
*G06F 17/00* (2019.01)
*G06F 40/274* (2020.01)
(Continued)

(52) U.S. Cl.
CPC .......... *G06F 40/274* (2020.01); *G06F 3/0482* (2013.01); *G06F 40/211* (2020.01); *G06F 40/216* (2020.01)

(58) Field of Classification Search
CPC .. G06F 17/276; G06F 17/271; G06F 17/2715; G06F 3/0482; G06F 40/274; G06F 40/211; G06F 40/216
(Continued)

(56) References Cited

U.S. PATENT DOCUMENTS 5,161,105 A  * 11/1992 Kugimiya ............. G06F 17/271
                                                     704/4
6,279,018 B1 *  8/2001 Kudrolli ................ G06F 17/277
                                                     715/234
(Continued)

FOREIGN PATENT DOCUMENTS

WO         2010112841 A1    10/2010

OTHER PUBLICATIONS

Nandi et al., Effective Phrase Prediction, ACM 2007, pp. 219-230. (Year: 2007).*
(Continued)

*Primary Examiner* — Cong-Lac Huynh
(74) *Attorney, Agent, or Firm* — Fiala & Weaver P.L.L.C.

(57) ABSTRACT

Methods, mobile electronic devices, and computer program products are provided for accepting reduced text entry of phrases, sentences or paragraphs, and probabilistically determining the most likely translation of the reduced text to a full text counterpart, and displaying same. Reduced text is accepted and parsed according to a predefined reduction pattern to produce parsed text elements. The parsed text elements are evaluated using n-gram knowledge and/or language models to identify the most likely words corresponding to the elements. The most likely corresponding words are used to evaluate the reduced text at the phrase level by evaluating the likelihood of transition from one word to the next amongst the most likely words, to compute phrase probabilities for various combinations of the most likely words. The most likely phrase(s) are output based in part on the phrase probabilities.

20 Claims, 5 Drawing Sheets

(51) Int. Cl.
*G06F 3/0482* (2013.01)
*G06F 40/211* (2020.01)
*G06F 40/216* (2020.01)

(58) Field of Classification Search
USPC ........................................ 715/716, 261, 780
See application file for complete search history.

(56) References Cited

U.S. PATENT DOCUMENTS

| | | | | |
|---|---|---|---|---|
| 7,167,825 | B1* | 1/2007 | Potter | H04L 9/065 |
| | | | | 380/42 |
| 7,475,343 | B1* | 1/2009 | Mielenhausen | G06F 17/24 |
| | | | | 715/261 |
| 2005/0267757 | A1* | 12/2005 | Iso-Sipila | G10L 13/08 |
| | | | | 704/260 |
| 2007/0076862 | A1 | 4/2007 | Chatterjee et al. | |
| 2007/0089070 | A1 | 4/2007 | Jaczyk | |
| 2007/0260602 | A1* | 11/2007 | Taylor | H04L 63/0245 |
| 2008/0294982 | A1* | 11/2008 | Leung | G06F 17/276 |
| | | | | 715/261 |
| 2011/0107206 | A1* | 5/2011 | Walsh | G06F 17/2785 |
| | | | | 715/256 |
| 2011/0184738 | A1* | 7/2011 | Kalisky | G06F 3/04883 |
| | | | | 704/260 |
| 2012/0259615 | A1* | 10/2012 | Morin | G06F 40/274 |
| | | | | 704/9 |
| 2014/0039871 | A1* | 2/2014 | Crawford | G06F 17/211 |
| | | | | 704/2 |
| 2016/0071511 | A1* | 3/2016 | Park | G10L 13/08 |
| | | | | 704/260 |
| 2016/0252972 | A1 | 9/2016 | Kim et al. | |
| 2016/0371250 | A1* | 12/2016 | Rhodes | G06F 17/276 |
| 2017/0169339 | A1* | 6/2017 | Dalmia | G06N 5/047 |
| 2017/0357633 | A1 | 12/2017 | Wang et al. | |
| 2018/0067912 | A1* | 3/2018 | DeLuca | G06F 17/24 |
| 2018/0089332 | A1* | 3/2018 | DeLuca | G06F 17/276 |
| 2019/0034406 | A1* | 1/2019 | Singh | G06F 3/0481 |
| 2019/0114478 | A1* | 4/2019 | Xi | G06K 9/00436 |
| 2019/0155916 | A1* | 5/2019 | Huang | G06F 17/278 |
| 2019/0392034 | A1* | 12/2019 | Medlock | G06F 3/0237 |
| 2020/0065370 | A1 | 2/2020 | Mannby | |

OTHER PUBLICATIONS

"International Search Report and Written Opinion Issued in PCT Patent Application No. PCT/US2019/030980", dated Jul. 2, 2019, 10 Pages.

"Non-Final Office Action Issued in U.S. Appl. No. 16/110,820", dated Sep. 19, 2019, 5 Pages.

* cited by examiner

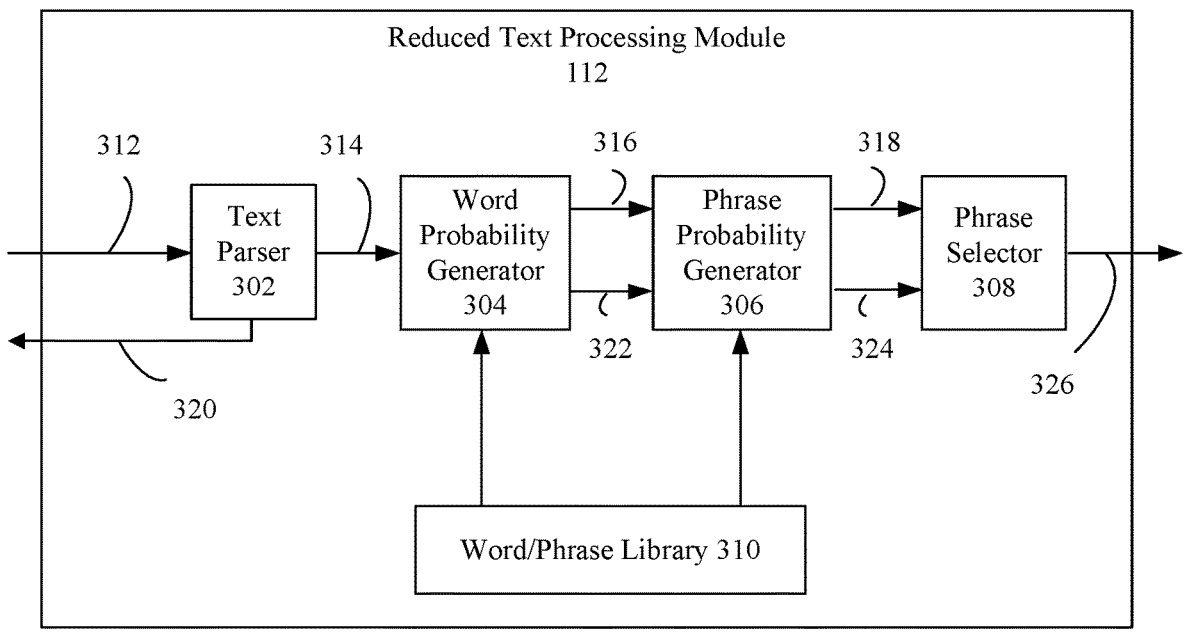
FIG. 3
400
Provide on the display component indications of the parsed text elements of the sequence — 402
FIG. 4
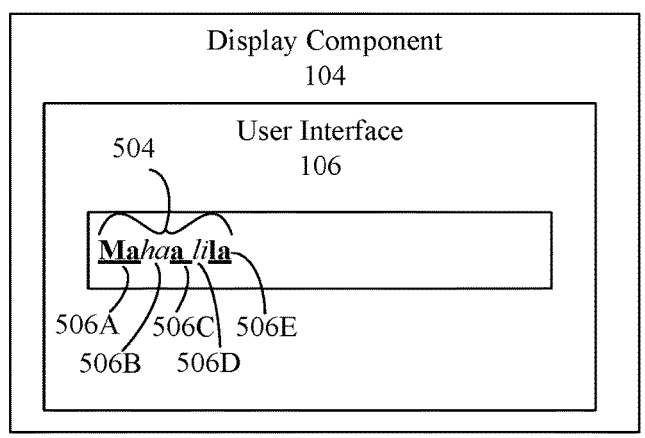
FIG. 5

600

┌──────────────────────────────────────────────────────────────┐
│ Provide on the display component a phrase of the plurality of phrases │ 602
│    having a highest probability among the set of phrase probabilities │
└──────────────────────────────────────────────────────────────┘

┌──────────────────────────────────────────────────────────────┐
│ Provide on the display component of the electronic device a predetermined │ 702
│ number of the plurality of phrases corresponding to the phrases having the │
│       highest probabilities among the set of phrase probabilities │
└──────────────────────────────────────────────────────────────┘

FIG. 7

PHRASE-LEVEL ABBREVIATED TEXT ENTRY AND TRANSLATION

BACKGROUND

Predictive auto-complete text entry is a function implemented in some text handling tools to automatically complete the text of a word after only a limited amount of text entry, as little as 1 to 3 keystrokes in some cases. Predictive auto-complete text entry tools save the user time by having the user enter fewer keystrokes in order to enter a full word. Such tools are particularly valuable on mobile devices that are used to send text messages (e.g., Short Message Service (SMS) messages, etc.), electronic mail, or other text intensive applications, particularly considering the relatively small keyboard featured on mobile devices. Predictive auto-complete text entry may also be referred to as "word completion." Predictive auto-complete text entry improves efficiency of text entry (i.e. improves speed and reduces errors) by reducing the number of characters that must be entered.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, apparatuses, and computer program products are provided that address limitations of word-level auto-correct, enabling correction at the phrase, sentence or paragraph level. In aspects, abbreviated text is entered in by the user, which may correspond to a full text phrase, such as a sentence or paragraph. One or more full text phrases are generated based on the abbreviated text, that are displayed according to the probability that the abbreviated text corresponds to the full text phrase.

In one implementation, a reduced text processing module is enabled to accept abbreviated text, parse the reduced text according to a predefined pattern to generate a sequence of parsed text elements, and determine one or more full text phrases, the words of which are most likely to correspond to the parsed text elements, and display the one or more full text phrases on a display component of a computing device. In one example, each of the sequence of parsed text elements is analyzed to determine a set of word probabilities, each of the probabilities being the probability that the particular parsed text element corresponds to a particular word. Further, the sets of word probabilities are analyzed to determine a plurality of phrase probabilities, each of the phrase probabilities being the probability that the reduced text corresponds to a particular full text phrase, sentence or paragraph.

In a further aspect, the abbreviated text is displayed on the display component of an electronic device, and the displayed text may also include indications that demark the sequence of parsed text elements.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows an example reduced text processing module, according to an example embodiment.

FIG. 4 shows a process for providing, on a display component, indications of parsed text elements parsed from reduced text entry, according to an embodiment.

FIG. 5 shows a display component showing example indications of parsed text elements parsed from a reduced text entry, according to an embodiment.

FIG. 6 shows a process for providing, on a display component, a phrase having the highest probability of corresponding to a reduced text entry, according to an example embodiment.

FIG. 7 shows a process for providing on a display component, a plurality of phrases having the highest respective probabilities of corresponding to a reduced text entry, according to an embodiment

Figure 1:
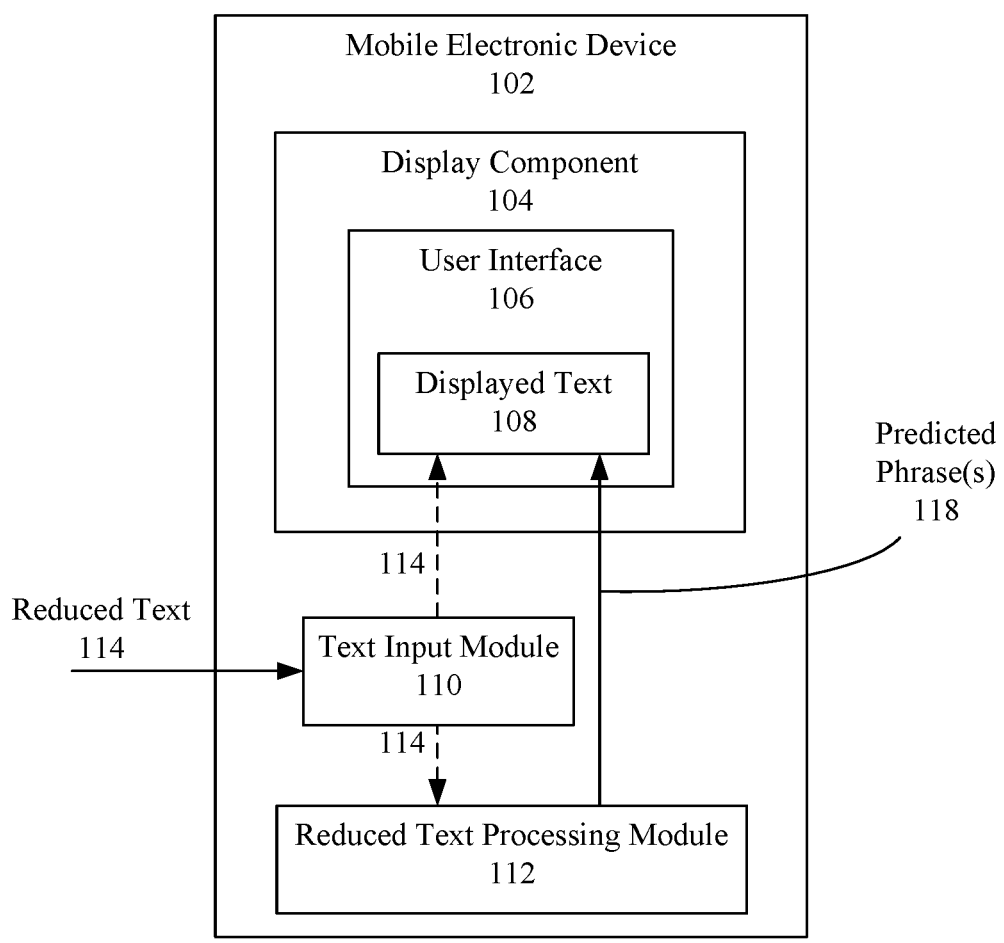
FIG. 1 shows a block diagram of a mobile electronic device that is equipped to accept and process reduced text entry, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Predictive auto-complete text entry is a function implemented in some text handling tools to automatically complete the text of a word after only a limited amount of text entry, as little as 1 to 3 keystrokes in some cases. Predictive auto-complete text entry tools save the user time by having the user enter fewer keystrokes in order to enter a full word. Such tools are particularly valuable on mobile devices that are used to send text messages (e.g., Short Message Service (SMS) messages, etc.), electronic mail, or other text intensive applications, particularly considering the relatively small keyboard featured on mobile devices. Predictive auto-complete text entry may also be referred to as "word completion."

Predictive auto-complete text entry improves efficiency of text entry (i.e. improves speed and reduces errors) by reducing the number of characters that must be entered. However, current auto-complete text entry tools are configured to operate only at the word level. That is, text entry is used to predictively auto-complete a single word rather than permit the user to continue entering text that is predictively auto-completed at the phrase, sentence or paragraph level. By potentially correcting every entered word rather than correcting at the phrase level, users are forced to slow their overall text entry rate and interrupt their own train of thought to look at whether the predictive auto-completely text entry correctly auto-completed the last word.

Embodiments described herein enable electronic devices, including mobile devices such as smart phones or tablets, to accept reduced text according to a predefined reduction pattern, to determine the probabilities that the reduced text corresponds to a plurality of full text phrases, which may include phrases, sentences, and/or paragraphs, and to display the one or more full text phrases on a display component of an electronic device according to such probabilities. Determining such probabilities may be accomplished in various ways, according to an embodiment.

Hereinafter, when the described embodiments refer to "abbreviated sentence-level text entry," "abbreviated sentence-level text," "abbreviated text," "reduced text" or the like, it should be understood that embodiments are not limited to sentences, but that these terms encompass phrases, sentences, and paragraphs.

In embodiments, such abbreviated text entry and translation may be implemented in a device in various ways. For instance, FIG. 1 shows a block diagram of a mobile electronic device 102 that is configured to perform abbreviated text entry and translation, according to an example embodiment. As shown in FIG. 1, mobile electronic device 102 includes a display component 104, a text input module 110, and a reduced text processing module 112. Display component 104 includes a display screen that displays a user interface 106. Mobile electronic device 102 and its features are described as follows.

Mobile electronic device 102 may be any type of mobile computer or computing device such as a handheld device (e.g., a Palm® device, a RIM Blackberry® device, a personal digital assistant (PDA)), a laptop computer, a notebook computer, a tablet computer (e.g., an Apple iPad™, a Microsoft Surface™, etc.), a netbook, a mobile phone (e.g., a smart phone such as an Apple iPhone, a Google Android™ phone, a Microsoft Windows® phone, etc.), a wearable device (e.g., virtual reality glasses, helmets, and visors, a wristwatch (e.g., an Apple Watch®)), and other types of mobile devices. Furthermore, although mobile electronic device 102 is indicated as a mobile device, embodiments may be implemented in stationary devices as well, including a personal computer.

Display component 104 is a display of mobile electronic device 102 that is used to display text (textual characters, including alphanumeric characters, arithmetic symbols, etc.), and optionally graphics, to users of mobile electronic device 102. For instance, display component 104 may include a display screen that is a portion of or an entirety of a surface of mobile electronic device 102. The display screen may or may not be touch sensitive. Display component 104 may be an LED (light emitting diode)-type display, an OLED (organic light emitting diode)-type display, an LCD (liquid crystal display)-type display, a plasma display, or other type of display that may or may not be backlit.

Text input module 110 is configured to receive reduced text 114 provided by a user to mobile electronic device 102. Mobile electronic device 102 may be configured to accept reduced text 114 from one or more user interface devices such as a keyboard (e.g., the user may type in the text), a thumb wheel, a pointing device, a roller ball, a stick pointer, a touch sensitive display, any number of virtual interface elements (e.g., such as a virtual keyboard or other user interface element displayed in user interface 106 by display component 104), and/or other user interface elements described elsewhere herein or otherwise known. In another embodiment, mobile electronic device 102 includes a haptic interface configured to interface mobile electronic device 102 with the user by the sense of touch, by applying forces, vibrations and/or motions to the user. For example, the user of mobile electronic device 102 may wear a glove or other prosthesis to provide the haptic contact.

In an embodiment, text input module 110 may store reduced text 114 (e.g., in memory or other storage), and pass on reduce text 114 to display component 104 for display as also shown in FIG. 1. Text input module 110 may provide reduced text 114 to display component 104 in any form (e.g., as character data, display pixel data, rasterized graphics, etc.). Text input module 110 may also provide reduced text 114 to reduced text processing module 112 for processing and translation according to one or more embodiments, and as described in further detail below.

In an embodiment, user interface 106 is a graphical user interface (GUI) that includes a display region in which displayed text 108 may be displayed. For instance, user interface 106 may be a graphical window of a word processing tool or a messaging tool in which text may be displayed, and may optionally be generated by text input module 110 for display by display component 104.

In an embodiment, and as noted above, reduced text processing module 112 may receive reduced text 114 from text input module 110. In embodiments, reduced text processing module 112 may be included in text input module 110, or may be separate from text input module 110, but still included in mobile electronic device 102 (as shown in FIG. 1). In another embodiment, reduced text processing module 112 may be separate from mobile electronic device 102 and accessible by mobile electronic device 102 over a network, such as a personal area network (PAN), a local area network (LAN), a wide area network (WAN), or a combination of networks such the Internet. For instance, reduced text processing module 112 may be accessible by mobile electronic device 102 over a network at a server, such as in a web service, a cloud service, etc.

In an embodiment, and as is described in greater detail herein below, reduced text processing module 112 may be configured to automatically parse reduced text 114, and probabilistically determine one or more phrases/sentences/paragraphs likely to correspond to reduced text 114. For instance, in an embodiment, reduced text processing module 112 may automatically parse reduced text 114 into a sequence of parsed elements, and determine word probabilities that each of the elements corresponds to any of a plurality of words.

In an embodiment, when providing reduced text 114 to display component 104 for display, text input module 110 may also provide indications or other information that identify each of the sequence of parsed elements in reduced text 114, thereby permitting display component 104 to display them distinctly and differently. For example, when reduced text 114 is displayed in user interface 106 as displayed text 108, the text characters corresponding to each of the sequence of parsed elements may be displayed in contrasting bold levels, different colors, and/or otherwise rendered to permit a visual differentiation of the parsed elements.

In an embodiment, reduced text processing module 112 may, based in part on the above-described word probabilities, further determine phrase probabilities wherein each phrase probability is the probability that the reduced text corresponds to a particular sequence of words (i.e. phrase, sentence or paragraph). Upon determining the phrase probabilities, reduced text processing module 112 may provide one or more of the corresponding predicted phrases 118 to display component 104 for display in user interface 106, in an embodiment.

As shown in FIG. 1, reduced text processing module 108 generates predicted phrase(s) 118, which is a full text version of reduced text 114 that was received from the user via text input module 110. In an embodiment, the user may enter reduced text according to a predefined reduction pattern. For example, the user may enter the first two letters of each word in the sentence, phrase or paragraph they would like to enter. In the case of a single letter word, just that single letter. For instance, the user may enter "mahaa-lila" and text processing module 108 may output "mary had a little lamb" as the predicted phrase 118 for display on the display component 104. In another embodiment, single letter words may be entered as two characters by padding the input with a blank space, for simpler parsing. In such an embodiment, "mary had a little lamb" corresponds to the entered reduced text "mahaa lila."

Figure 2:
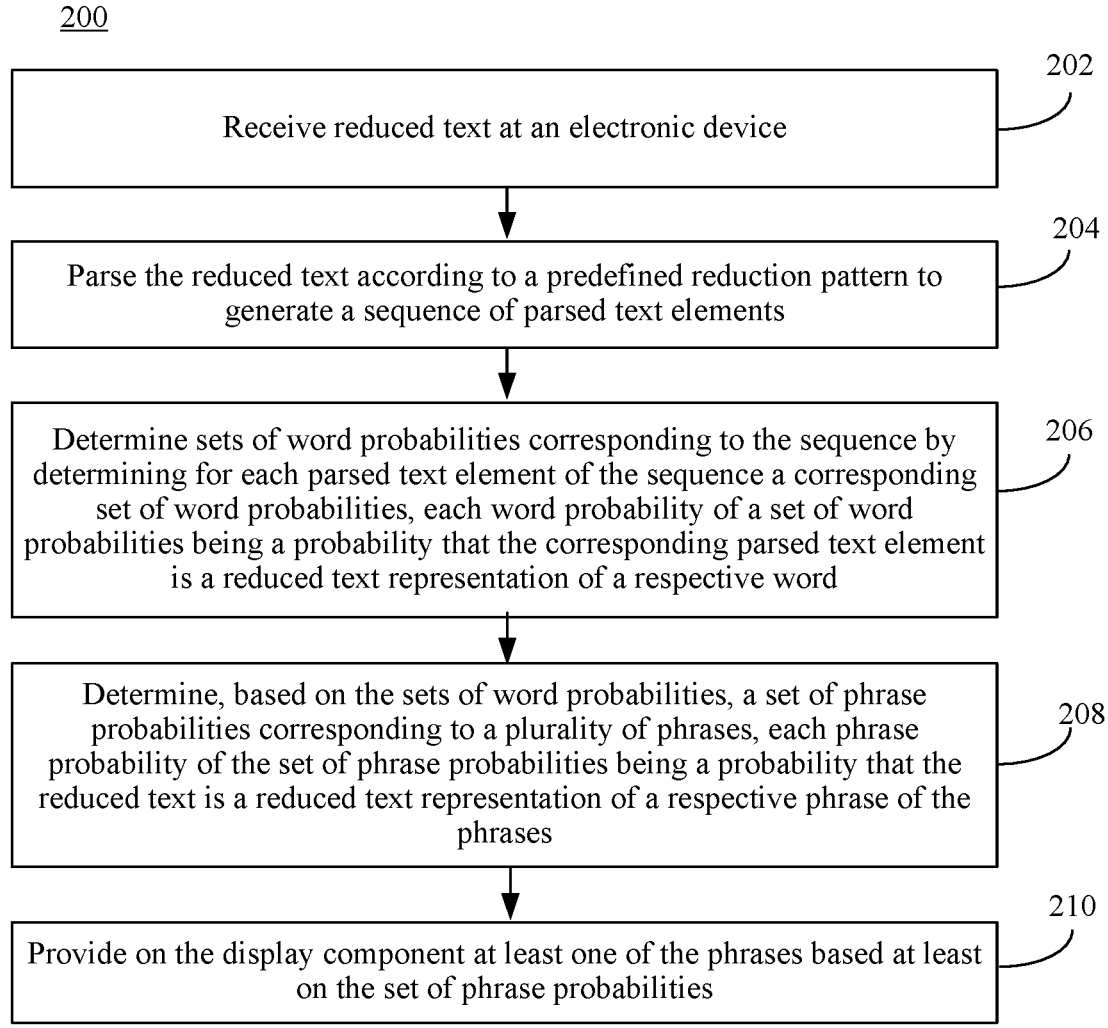
FIG. 2 shows a flowchart of a method for receiving and processing reduced text to produce and display a phrase based on the probability the phrase corresponds to the reduced text entry, according to an example embodiment.

In embodiments, text processing module 108 of mobile electronic device 102 may generate, for example, "mary had a little lamb" from "mahaa lila" in various ways. For instance, FIG. 2 shows a flowchart 200 of an example method for probabilistically generating and displaying a full text phrase from a reduced text entry, according to an example embodiment. Each stage of flowchart 200 may be performed by reduced text processing module 112 of mobile electronic device 102, in an embodiment. Note, however, that in other embodiments, the steps of flowchart 200 may be performed by other modules or components of electronic mobile device 102. For instance, any operations described hereinafter as being performed by reduced text processing module 112 may be integrated into one or more other modules such as, for example, text input module 110. Other structural and operational embodiments will be apparent to persons skilled in the relevant art(s) based on the following discussion regarding flowchart 200.

Flowchart 200 begins at step 202. In step 202 of flowchart 200, reduced text is received from the user at an electronic device. For example, as shown in FIG. 1, text input module 110 of mobile electronic device 102 receives reduced text 114. Reduced text 114 is text that is entered by the user according to a predefined reduction pattern. A reduction pattern is a rule that dictates which characters of words in a phrase ought to be input during text entry. One such reduction pattern is described immediately above, wherein the reduced text consists of the first two letters of each word, with single-letter words padded with a space. Of course, other reduction patterns are possible in embodiments. For example, another reduction pattern may consist of the first and last letter of each word, where again single letter words are padded with a space. Under this reduction pattern, "mary had a little lamb" corresponds to the reduced text "myhda lelb." Additional example reductions patterns, along with the resulting reduced text, are:

Initial letter plus first vowel:
  "the dinosaur was furious"→"tediwafu"
Initial letter plus last letter plus vowel of tonic syllable:
  "slow speaking can help"→"sowsegcanhep"
Initial 2 letters plus last letter:
  "important papers should not get lost"→"imtpasshdnotgetlot"

In addition to a choice of letters, the reduction patterns of other embodiments may allow for ambiguity in text entry to account for uncertain spelling. Uncertain spelling may occur where the user either does not know how to spell a word and guesses certain portions, or they make a common misspelling. For example, vowels "i" and "y" and "e" may be phonetically ambiguous. Applying this concept and the last reduction pattern shown above (i.e. first 2 letters+last letter) to the phrase "the eclipse yields glee" could result in the reduced text "theyceyesgli."

In embodiments, the user may select a preferred reduction pattern to be recognized by, for example, mobile electronic device 102. Translation to full text from reduced text by mobile electronic device 102 may be made easier if both the user and device 102 know which reduction pattern is being used at any given time. This is because the reduction pattern dictates how embodiments parse the reduced text received at step 202. Parsing of the reduced text is the first step in disambiguating the reduced text, and determining the likely full text phrase or phrases that may correspond to the reduced text. However, in an embodiment, mobile electronic device 102 may be configured to determine a particular reduction pattern that a user applied to reduced text 114 by analyzing reduced text 114 according to the embodiments described herein, and sequencing through a list of various acceptable reduction patterns.

Continuing at step 204 of flowchart 200, the reduced text is parsed according to a predefined reduction pattern to generate a sequence of parsed text elements. For example, as shown in FIG. 1, text input module 110 may provide reduced text 114 to reduced text processing module 112, and reduced text processing module 112 may be configured to perform the parsing.

For instance, referring again to the reduction pattern comprising the first two letters of each word, the phrase "mary had a little lamb" maps to the reduced text "mahaa lila." Reduced text processing module 112 may be configured to parse the reduced text "mahaa lila" into a sequence of parsed text elements based on the knowledge that each word of the phrase is mapped to exactly two text characters. Thus, the sequence of parsed text elements parsed from "mahaa lila" consists of the two-character text elements of each word: "ma", "ha", "a", "li" and "la". Each reduction pattern, including those shown above, results in a constant number of characters per full text word being input as the reduced text. Accordingly, reduced text processing module 112 can unambiguously parse such reduced text into a sequence of parsed text elements based on the corresponding constant number. Each parsed text element in the sequence of parsed text elements corresponds to a particular word of the full-text phrase. It is not, however, always possible to perfectly determine which particular full-text word corresponds to a particular parsed text element. For example, the parsed text element "ma" could correspond to any word that begins with the letters "ma". (e.g. mary, made, mad, man, mars, etc.). Accordingly, "mahaa lila" could be "Mary had a little lamb," or it could be "manacles handle a likely larcenist." Embodiments use full phrase translation to enable better prediction of such words as compared to conventional single word auto-correct techniques.

Referring back to FIG. 2, in step 206, sets of word probabilities corresponding to the sequence are determined by determining for each parsed text element of the sequence a corresponding set of word probabilities, each word probability of a set of word probabilities being a probability that the corresponding parsed text element is a reduced text representation of a respective word. For example, reduced text processing module 112 of FIG. 1 may be configured to determine sets of word probabilities corresponding to the sequence of parsed text elements determined in step 204. Reduced text processing module 112 may be configured to attempt to resolve any ambiguity in word determination by determining the probability that a given parsed text element corresponds to one or more words in step 206 and, as described in further detail below, the probability that the sequence of parsed text elements corresponds to a particular full text phrase.

For example, for each parsed text element of the sequence of parsed text elements generated at step 204, reduced text processing module 112 may be configured to generate a set of word probabilities that the parsed text element in question corresponds to a set of respective words. For example, based on the example above, the reduced text for "mary had a little lamb" is parsed into the text elements: "ma", "ha", "a", "li" and "la". Working with this example, reduced text processing module 112 may generate a set of probabilities that the parsed text element "ma" corresponds to a particular word. In an example embodiment, the set may consist of a predetermined number of tuples, each tuple having the form (word, word_probability), where word is the full-text word, and word_probability is the probability that the given parsed text element corresponds to that word. Supposing that each set contains the five most likely words, in an embodiment the set corresponding to parsed text element "ma" could be: [("many", p1), ("make", p2), ("may", p3), ("made", p4), ("man", p5)], where p1-p5 are the probabilities corresponding to each word.

To determine the word_probability for each tuple in the set, reduced text processing module 112 may use word lists and word-based language models that provide the probability of encountering words, and using methods known in the art, such as table lookup, hash maps, tries, and the like, to find exact or fuzzy matches for the given parsed text element. In embodiments, language models and algorithms work with words or parts of words, and can encode the likelihood of seeing another word or part of word after another based on specific words, word classes (such as "sports"), parts-of-speech (such as "noun"), or more complex sequences of such parts, such as in grammar models or neural network models, such as Recurring Neural Networks or Convolutional Neural Networks.

In an embodiment, and continuing with the foregoing example, reduced text processing module 112 continues by computing additional sets of probabilities for the remaining parsed text elements. In the current example, the parsed text elements "ha", "a", "li" and "la". Reduced text processing module 112 generates sets of word probabilities (one set for each of the sequence of parsed text elements generated at step 204), wherein each set comprises the probabilities that certain words correspond to each parsed text element. Ultimately, reduced text processing module 112 generates a full-text phrase from the reduced text input. Just as parsed text elements may be mapped onto multiple possible words, different sets of words for a set of parsed text elements may be mapped onto multiple possible phrases. Of course, not all such phrases are equally likely. Referring again the "Mary had a little lamb" example and the ambiguity between "Mary had a little lamb" and "manacles handle a likely larcenist," it can be appreciated that the latter phrase must be substantially less likely than the former owing to the fact that the words "manacles" and "larcenist" are quite rarely used in everyday writing. Accordingly, reduced text processing module 112 may use the sets of word probabilities to probabilistically determine a likely phrase or phrases that may map onto reduced text 114.

Step 206 of flowchart 600 proceeds to step 208. In step 208, a set of phrase probabilities corresponding to a plurality of phrases is determined based on the sets of word probabilities, with each phrase probability of the set of phrase probabilities being a probability that the reduced text is a reduced text representation of a respective phrase of the phrases. In an embodiment, reduced text processing module 112 determines a set of phrase probabilities corresponding to a plurality of phrases. Each of the phrase probabilities in the set represents the probability that the reduced text received at step 202 of flowchart 200 is a reduced text representation of the respective phrase. Similar to the sets of word probabilities described above, the set of phrase probabilities may consist of a number of tuples, each tuple having the form (phrase, phrase_probability) where phrase is the full-text phrase, and phrase_probability is the probability that the reduced text received at step 202 corresponds to that phrase.

In embodiments, the sets of word probabilities determined by reduced text processing module 112 are used by reduced text processing module 112, in part, to determine the phrase probabilities at step 208. In particular, reduced text processing module 112 may use the word probabilities and algorithms (such as the Viterbi algorithm in one embodiment), or phrase-based language models to find likely matches for sequences of words based on the likelihood of the transition from one word to another. Such likelihood may be based on phrase lists and language models that provide the probability of encountering particular word sequences. For example, one may use n-gram knowledge that reflects the probability that "ha" words follow "ma" words. In the case where the "ma" word being considered is "Mary", reduced text processing module 112 may also consider instances of "ha" words following nouns, proper nouns and/or female proper nouns. That is, the word probabilities and/or language models may not only encode the likelihood of seeing another word based on specific adjacent words, but also take into account word classes (such as "sports"), parts-of-speech (such as "noun"), or more complex sequences of such parts, such as in grammar models or neural network models, such as Recurring Neural Networks or Convolutional Neural Networks, implemented by reduced text processing module 112.

In determining phrase probabilities at step 208, and with further reference to the "mary had a little lamb" example, reduced text processing module 112 may consider the parsed text element "a" in the context of surrounding word candidates. Here, "a" is unambiguously the word "a" and reduced text processing module 112 may also walk backward by considering what words are most likely to proceed an "a", and mostly likely to proceed each n-gram as reduced text processing module 112 walks back up the sequence of parsed text elements.

It should be noted that the sets and tuples described in conjunction with words and phrases of steps 206 and 208, respectively, are merely exemplary, and no particular data structure or other data format or processing should be inferred. Indeed, other embodiments described herein below process words and phrases, and the probabilities associated therewith, separately. As shown in FIG. 1, reduced text processing module 112 generates one or more predicted phrases 118, which includes the set of phrase probabilities to contain the probabilities of the phrases that are most probable, along with some means of associating such probabilities with particular phrases.

In the foregoing discussion of steps 204-208 of flowchart 200, it should be also be understood that at times, such steps may be performed in a different order or even contemporaneously with other steps. For example, in embodiments, receipt of reduced text at an electronic device as shown in step 202 may occur continuously, and processing associated with parsing of such reduced text at step 204 to generate parsed text elements may occur as each of the characters of the reduced text are entered. That is, some or all of steps 204-208 may occur even during execution of step 202 wherein reduced text is being received since word and/or phrase probabilities may be assessed and updated in real-time. Likewise, determining or updating the sets of word probabilities at step 204 based on the most recently entered characters of reduced text may occur while the set of phrase probabilities is still being determined based on prior input at step 208.

After determining a set of phrase probabilities at step 208, flowchart 200 continues at step 210. In step 210, at least one of the phrases is provided on the display component based at least on the set of phrase probabilities. In an embodiment, as shown in FIG. 1, reduced text processing module 112 provide may predicted phrase(s) 118 to for display in user interface 106 of display component 104 as displayed text 108. In an embodiment, a single phrase associated with the highest probability may be provided in predicted phrase(s) 118 for display as displayed text 108. In an embodiment, such display may be made by automatically substituting the phrase for reduced text 114. In another embodiment, the user may be given the option to substitute the most probable phrase for reduced text 114. Alternatively, multiple phrases (with highest probabilities) may be provided in predicted phrase(s) 118 for display as displayed text 108, and a user may interact with user interface 106 to select one for substitution.

As noted above, each stage of flowchart 200 may be performed by reduced text processing module 112 of mobile electronic device 102, in an embodiment. Reduced text processing module 112 may be configured in various ways to perform these functions. For instance, FIG. 3 shows an example of reduced text processing module 112, according to an embodiment. Reduced text processing module 112 of FIG. 3 includes a text parser 302, a word probability generator 304, a phrase probability generator 306, a phrase selector 308, and a word/phrase library 310. Reduced text processing module 112 is configured to receive reduced text 312, and output either an indication of parsed text elements 320 to a display component, one or more phrases 326 to the display component, or both. The following description of reduced text processing module 112 begins with text parser 302 accepting reduced text 312.

Reduced text processing module 112 is configured to receive reduced text 312 (e.g., according to step 202 of FIG. 2), and forward the same to text parser 302. As described above, reduced text 312 is an example of reduced text 114 of FIG. 1, and an electronic representation of text entered by the user at a user interface according to a predefined reduction pattern, wherein a reduction pattern is a rule that dictates which characters of words in a phrase to be input during text entry. One example predefined reduction pattern requires the user to enter the first two letters of each word within the phrase. Again, as described above, such a reduction pattern would lead the user to enter "mahaa lila" for "Mary had a little lamb", wherein "mahaa lila" is reduced text 312.

Text parser 302 may be configured to parse reduced text 312 (e.g., according to step 204 of FIG. 2), according to the predefined reduction pattern, to generate parsed text 314. In an embodiment, parsed text 314 corresponds to the sequence of parsed text elements described above in relation to flowchart 200. With the example of "Mary had a little lamb" being in the form of reduced text 312 as "mahaa lila", and the predefined reduction pattern comprises the first two letters of each word, parsed text 314 is generated as "Ma", "ha", "a", "li", and "la" In an embodiment, after text parser 302 parses reduced text 312 to generate parsed text 314, information regarding how reduced text 312 was parsed to become parsed text 314 may be used to display reduced text 312 on a display device in a manner that indicates how parsed text 314 was parsed. As is described in further detail below, such indications distinguish each parsed text element from any adjacent parsed text elements, such as by using color or emphasis through underlining, italics or bold typefaces. In an embodiment, parsed text 314 is received by word probability generator 304 of FIG. 3 to determine the likelihood that each element of parsed text 314 corresponds to a particular word.

In an embodiment, word probability generator 304 is configured to determine word probabilities and words (e.g., according to step 206 of FIG. 2), as shown in FIG. 3. In addition to accepting parsed text 314 from text parser 302, word probability generator 304 may be further configured to look up and accept word and word probability pairs based on parsed text 314 from word/phrase library 310. In an embodiment, word/phrase library 310 contains or provides n-gram probability statistics for various types of n-grams. For example, word/phrase library 310 may contain or provide probability statistics for words that start with the letters "Ma". More specifically, or phrase library 310 may be configured to provide, for example, the top 10 most common words that begin with the letters "Ma", along with the probability or frequency statistics of each.

In an embodiment, word probability generator 304 may be configured to retrieve, for example, the 10 most common words that began with the letters of each of the elements and parsed text 314. Referring again to the example above, after word probability generator 304 receives the 10 most common "Ma" words and their respective probabilities from word/phrase library 310, word probability generator 304 queries word, phrase library 310 for the 10 most common words in their respective probabilities for each of: "ha", "li", and "la" (Note, the "a" element of parsed text 314 is a special case, since "a" is a word that is not ambiguous, and thus need not be determined probabilistically). That is, embodiments of word probability generator 304 are configured to determine full text words that may map onto each element of parsed text 314, along with the respective probabilities that each such mapping is correct. However, it should be understood that the foregoing description of word probability generator 304 retrieving the 10 most common words/probabilities is merely exemplary. In embodiments, word probability generator 304 may be configured to retrieve or receive greater or fewer than 10 words/probabilities. In alternative embodiments, word probability generator 304 may be configured to receive or query for words and their respective probabilities only where such probabilities exceed a specified threshold.

After gathering the candidate words and their respective probabilities based on parsed text 314, word probability generator 304 is configured to provide word probabilities 316 and words 322 to phrase probability generator 306. Based upon word probabilities 316 and words 322, phrase probability generator 306 is configured to generate phrases 324 and their respective phrase probabilities 318 (e.g., according to step 208 of FIG. 2). Phrase probability generator 306 is configured to interface with word/phrase library 310 to determine phrases 324 and phrase probabilities 318, by assessing the likelihood of seeing a particular word of words 322 after another word of words 322. In some cases, where a word is known with certainty (e.g. "a"), phrase probability generator may determine phrases 324 and phrase probabilities 318 by walking the sequence of words in reverse. That is, embodiments may assess the likelihood of seeing a particular word of words 322 in a phrase before a known word of words 322. As described above, this determination may be based on n-gram knowledge contained in word/phrase library 310, as well as phrase-based language models that enable finding likely matches for sequences of words based on the likelihood of transitions from one word to another. After determining phrases 324 and phrase probabilities 318, phrase probability generator 306 is configured to pass same to phrase selector 308.

Phrase selector 308 of reduced text processing module 112 is configured to select from amongst phrases 324, one or more phrases 326 for display (e.g., according to step 208 of FIG. 2). As is described in more detail below, phrase selector 308 may be configured to select a single phrase of phrases 324 for output to a display. In an embodiment, phrase selector 308 selects a single phrase 326 for output to a display, the phrase 326 corresponds to the phrase of phrases 324, having the highest phrase probability amongst phrase probabilities 318. In another embodiment, phrase selector 308 may be configured to select a certain predetermined number of phrases from amongst phrases 324, and output same as phrases 326 for display. In an embodiment, phrase selector 308. In an embodiment, the multiple phrases 326 selected for output to a display are the phrases of phrases 324 having the highest corresponding probabilities in phrase probabilities 318. In an alternative embodiment, the multiple phrases 326 selected for output to a display are the phrases of phrases 324 having probabilities in phrase probabilities 318 that exceed a predetermined threshold.

Although word probability generator 304, phrase probability generator 306 and work/phrase library 310 are depicted as being separate from one another, it will be apparent to persons skilled in the art that operations of each may be wholly or partly incorporated into the same component. For example, in some embodiments word probability generator 304, phrase probability generator 306 and work/phrase library 310 may be combined into the same component because the output of word probability generator 304 is provided only to phrase probability generator 306, and word/phrase library 310 services those components. Further structural embodiments will be apparent to persons skilled in the relevant art based the foregoing descriptions.

Reduced text processing module 112 may operate in various ways to select phrase(s) for display 326, and indications of parsed text elements 320 output by phrase selector 308 and text parser 302, respectively. For example, in an embodiment, phrase selector 308 may operate according to step 210 of flowchart 200, and optionally perform additional steps. For example, embodiments may perform according the FIG. 4 after performing the method steps of flowchart 200 as shown in FIG. 2. In particular, FIG. 4 shows a flowchart 400 providing a step whereby additional information may be displayed on, for example, display component 104 of FIG. 1. Flowchart 400 is described as follows.

In step 402, indications of the parsed text elements of the sequence are provided on the display component. In an embodiment, text parser 302 (FIG. 3) may provide an indication to user interface 106 (FIG. 1) of the parsed text elements of parsed text 302 to be used to display indications of the sequence of parsed text elements in reduced text 114 displayed in user interface 106.

For example, FIG. 5 shows display component 104 showing example indications of parsed text elements parsed from a reduced text entry 504, according to an embodiment. In FIG. 5, display component 104 displays user interface 106, which includes a text entry box in which a user entered "Mahaa lila" as reduced text 504, which is reduced text for the "Mary had a little lamb" example described. At step 402 of FIG. 4, and as shown in FIG. 5, reduced text 504 is displayed. In addition, however, each element of a sequence of parsed text elements 506A-506E (corresponding to "Ma", "ha", "a", "li" and "la") that comprises reduced text 504 has been modified with an indication to highlight the boundaries between each parsed text element. In an embodiment, text parser 302 provides an indication of the parsed text to user interface 106 to enable distinct display for each parsed text element. In particular, elements 506A-506E of FIG. 5 correspond to the parsed text elements denoted immediately above. In an embodiment, each of the parsed text elements are displayed in a distinct manner such as, for example, as shown in FIG. 5 where each of the parsed text elements are rendered in turn with distinct font characteristics. That is, in an embodiment, alternating parsed text elements 506A, 506C and 506E are displayed in a bold and underlined font style. The intervening elements 506B and 506D are displayed in an italic font style. Rendering the received reduced text in a manner such as this, such that each parsed text element is apparent to the user, useful feedback is provided to the user who, being aware of the active reduction pattern, may more easily notice if a typo has been entered and be enabled to take corrective action.

Note that bold, underlined, and italic font styles are but one example means of displaying each of the sequence of parsed text elements in a distinct manner. Any other means, including different colors, greyscale, type sizes, spacing, etc., may be used singly or in any combination to indicate the parsed text elements in a distinguishing manner.

As described above in step 210 of flowchart 200, embodiments may provide on the display component at least one of the phrases associated with the set of phrase probabilities determined at step 208 of flowchart 200. For instance, FIG. 6 shows a flowchart 600 providing a step 602 for selecting the phrase to be displayed. In particular, in step 602, a phrase of the plurality of phrases having a highest probability among the set of phrase probabilities is provided on the display component. In an embodiment, phrase selector 308 is configured to select a phrase of the plurality of phrases determined to have highest probability of the set of phrase probabilities for display in user interface 106.

There may not, however, always be sufficiently different probabilities associated with the most likely of the plurality of phrases for the highest probability to be meaningfully different. Or, it may be desired to display multiple phrases for the user to select from. For instance, FIG. 7 shows a flowchart 700 that includes a step 702 providing an alternative embodiment for such situations. In particular, in step 702, a predetermined number of the plurality of phrases corresponding to the phrases having the highest probabilities among the set of phrase probabilities is provided on the display component of the electronic device. In an embodiment, phrase selector 308 is configured to select a plurality of phrases determined to have highest probability of the set of phrase probabilities for display in user interface 106. In an embodiment, for example, a predetermined number of phrases with highest probabilities may be selected, or the number selected may be based on a probability threshold (i.e., only those phrases with phrase probabilities exceeding a certain threshold are selected). In still another embodiment, the predetermined number may be dictated by other criteria such as available screen area on the display component of the electronic device (e.g., a fixed number such as 3 may be selected because only 3 display lines are available).

III. Example Computer System Implementation

Mobile electronic device 102, text input module 110, reduced text processing module 112, text parser 302, word probability generator 304, phrase probability generator 306, phrase selector 308, and flowcharts 200, 400, 600 and 700 may be implemented in hardware, or hardware combined with software and/or firmware. For example, text input module 110, reduced text processing module 112, text parser 302, word probability generator 304, phrase probability generator 306, phrase selector 308, and/or flowcharts 200, 400, 600 and/or 700 may be implemented as computer program code/instructions configured to be executed in one or more processors and stored in a computer readable storage medium. Alternatively, text input module 110, reduced text processing module 112, text parser 302, word probability generator 304, phrase probability generator 306, phrase selector 308, and/or flowcharts 200, 400, 600 and/or 700 may be implemented as hardware logic/electrical circuitry (e.g., electrical circuits comprised of transistors, logic gates, operational amplifiers, one or more application specific integrated circuits (ASICs), one or more field programmable gate arrays (FPGAs), etc.).

For instance, in an embodiment, one or more, in any combination, of text processing module 112, text parser 302, word probability generator 304, phrase probability generator 306, phrase selector 308, and/or flowcharts 200, 400, 600 and/or 700 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
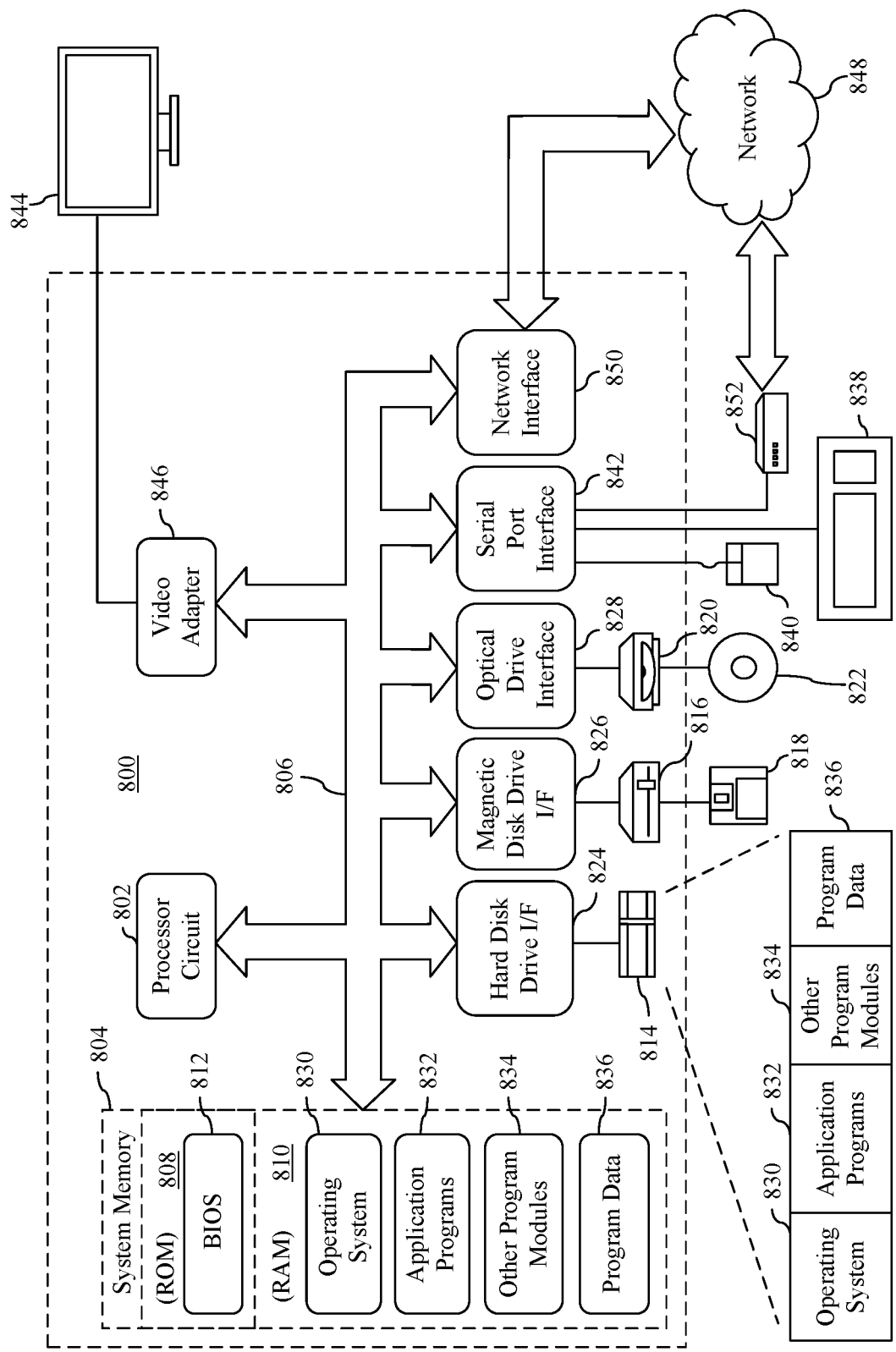
FIG. 8 is a block diagram of an example processor-based computer system that may be used to implement various embodiments.

FIG. 8 depicts an exemplary implementation of a computing device 800 in which embodiments may be implemented. For example, mobile electronic device 102 may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing text processing module 112, text parser 302, word probability generator 304, phrase probability generator 306, phrase selector 308, and/or flowcharts 200, 400, 600 and/or 700 (including any suitable step of flowcharts 200, 400, 600 and 700), and/or further embodiments described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments described herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A computer-implemented method of producing a text phrase from reduced input text entry is described herein. The method includes: receiving reduced text at an electronic device; parsing the reduced text according to a predefined reduction pattern to generate a sequence of parsed text elements; determining sets of word probabilities corresponding to the sequence by determining for each parsed text element of the sequence a corresponding set of word probabilities, each word probability of a set of word probabilities being a probability that the corresponding parsed text element is a reduced text representation of a respective word; determining, based on the sets of word probabilities, a set of phrase probabilities corresponding to a plurality of phrases, each phrase probability of the set of phrase probabilities being a probability that the reduced text is a reduced text representation of a respective phrase of the phrases; and providing at a user interface of the electronic device at least one of the phrases.

In one embodiment of the foregoing method, the predefined reduction pattern defines each parsed text element to include at least one of a predetermined number of initial letters of a corresponding word or a predetermined number of final letters of the corresponding word.

In one embodiment of the foregoing method, the predefined reduction pattern further defines each parsed text element to include a first vowel of the corresponding word or a vowel of a tonic syllable of the corresponding word.

Another embodiment of the foregoing method further comprises providing on a user interface of the electronic device indications of the parsed text elements of the sequence.

In one embodiment of the foregoing method, the indications of the parsed text elements of the sequence comprise colors of a color coding scheme.

In another embodiment of the foregoing method, the color coding scheme assigns colors to the parsed text elements, each parsed text element assigned a color of the color coding scheme corresponding to the determined probability that the parsed text element corresponds to the word.

Another embodiment of the foregoing method further comprises providing on the user interface of the electronic device a single phrase of the plurality of phrases having a highest probability among the second plurality of probabilities.

One embodiment of the foregoing method further comprises providing on the user interface of the electronic device a predetermined number of the plurality of phrases corresponding to the phrases having the highest probabilities among the second plurality of probabilities.

A mobile electronic device is described herein. The mobile electronic device includes: a display component capable of at least displaying textual characters; a text input module that receives reduced text provided by a user to the mobile electronic device; and a reduced text processing module that includes: a text parser configured to parse the reduced text according to a predefined reduction pattern to generate a sequence of parsed text elements; a word probability generator configured to determine sets of word probabilities corresponding to the sequence by determining for each parsed text element of the sequence a corresponding set of word probabilities, each word probability of a set of word probabilities being a probability that the corresponding parsed text element is a reduced text representation of a respective word; a phrase probability generator configured to determine, based on the sets of word probabilities, a set of phrase probabilities corresponding to a plurality of phrases, each phrase probability of the set of phrase probabilities being a probability that the reduced text is a reduced text representation of a respective phrase of the phrases; and a phrase selector configured to provide on the display component at least one of the phrases.

In one embodiment of the foregoing mobile electronic device, the predefined reduction pattern defines each parsed text element to include at least one of a predetermined number of initial letters of a corresponding word or a predetermined number of final letters of the corresponding word.

In one embodiment of the foregoing mobile electronic device, the predefined reduction pattern further defines each parsed text element to include a first vowel of the corresponding word or a vowel of a tonic syllable of the corresponding word.

In another embodiment of the foregoing mobile electronic device, the text parser is further configured to provide to the display component indications of the parsed text elements of the sequence.

In one embodiment of the foregoing mobile electronic device, the indications of the parsed text elements of the sequence comprise colors of a color coding scheme.

In another embodiment of the foregoing mobile electronic device, the color coding scheme assigns colors to the parsed text elements, each parsed text element assigned a color of the color coding scheme corresponding to the determined probability that the parsed text element corresponds to the word.

In another embodiment of the foregoing mobile electronic device, the phrase selector is configured to provide to the display component a single phrase of the plurality of phrases having a highest probability among the second plurality of probabilities.

In another embodiment of the foregoing mobile electronic device, the phrase selector is configured to provide to the display component a predetermined number of the plurality of phrases corresponding to the phrases having the highest probabilities among the second plurality of probabilities.

A computer program product comprising a computer-readable memory device having computer program logic recorded thereon that when executed by at least one processor of a computing device causes the at least one processor to perform operations is described herein. The operations include: receiving reduced text at an electronic device; parsing the reduced text according to a predefined reduction pattern to generate a sequence of parsed text elements; determining sets of word probabilities corresponding to the sequence by determining for each parsed text element of the sequence a corresponding set of word probabilities, each word probability of a set of word probabilities being a probability that the corresponding parsed text element is a reduced text representation of a respective word; determining, based on the sets of word probabilities, a set of phrase probabilities corresponding to a plurality of phrases, each phrase probability of the set of phrase probabilities being a probability that the reduced text is a reduced text representation of a respective phrase of the phrases; and providing at a user interface of the electronic device at least one of the phrases.

In one embodiment of the foregoing computer program product, the predefined reduction pattern defines each parsed text element to include at least one of a predetermined number of initial letters of a corresponding word or a predetermined number of final letters of the corresponding word.

In another embodiment of the foregoing computer program product, the predefined reduction pattern further defines each parsed text element to include a first vowel of the corresponding word or a vowel of a tonic syllable of the corresponding word.

In one embodiment of the foregoing computer program product, the operations further include providing on the user interface of the electronic device a single phrase of the plurality of phrases having a highest probability among the second plurality of probabilities.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer-implemented method of producing a text phrase from reduced input text entry, comprising:
   receiving reduced text comprising a plurality of reduced text elements at an electronic device;
   parsing the reduced text according to a predefined reduction pattern to generate a sequence of parsed text elements each corresponding to a respective one of the plurality of reduced text elements;
   determining sets of word probabilities corresponding to the sequence by determining for each parsed text element of the sequence a corresponding set of word probabilities, each word probability of a set of word probabilities being a probability that the corresponding parsed text element is a reduced text representation of a respective word;
   determining, based on the sets of word probabilities, a set of phrase probabilities corresponding to a plurality of phrases, each phrase probability of the set of phrase probabilities being a probability that the reduced text is a reduced text representation of a respective phrase of the phrases; and
   providing at a user interface of the electronic device at least one of the phrases.

2. The computer-implemented method of claim 1, wherein the predefined reduction pattern defines each parsed text element to include at least one of a predetermined number of initial letters of a corresponding word or a predetermined number of final letters of the corresponding word.

3. The computer-implemented method of claim 2, wherein the predefined reduction pattern further defines each parsed text element to include a first vowel of the corresponding word or a vowel of a tonic syllable of the corresponding word.

4. The computer-implemented method of claim 1, further comprising:
providing on a user interface of the electronic device indications of the parsed text elements of the sequence.

5. The computer-implemented method of claim 4, wherein the indications of the parsed text elements of the sequence comprise colors of a color coding scheme.

6. The computer-implemented method of claim 5, wherein the color coding scheme assigns colors to the parsed text elements, each parsed text element assigned a color of the color coding scheme corresponding to the determined probability that the parsed text element corresponds to the word.

7. The computer-implemented method of claim 1, further comprising:
providing on the user interface of the electronic device a single phrase of the plurality of phrases having a highest probability among the set of phrase probabilities.

8. The computer-implemented method of claim 7, further comprising:
providing on the user interface of the electronic device a predetermined number of the plurality of phrases corresponding to the phrases having the highest probabilities among the set of phrase probabilities.

9. A mobile electronic device, comprising:
a display component capable of at least displaying textual characters;
a text input module that receives reduced text provided by a user to the mobile electronic device, the reduced text comprising a plurality of reduced text elements; and
a reduced text processing module that includes:
a text parser configured to parse the reduced text according to a predefined reduction pattern to generate a sequence of parsed text elements each corresponding to a respective one of the plurality of reduced text elements;
a word probability generator configured to determine sets of word probabilities corresponding to the sequence by determining for each parsed text element of the sequence a corresponding set of word probabilities, each word probability of a set of word probabilities being a probability that the corresponding parsed text element is a reduced text representation of a respective word;
a phrase probability generator configured to determine, based on the sets of word probabilities, a set of phrase probabilities corresponding to a plurality of phrases, each phrase probability of the set of phrase probabilities being a probability that the reduced text is a reduced text representation of a respective phrase of the phrases; and
a phrase selector configured to provide on the display component at least one of the phrases.

10. The mobile electronic device of claim 9, wherein the predefined reduction pattern defines each parsed text element to include at least one of a predetermined number of initial letters of a corresponding word or a predetermined number of final letters of the corresponding word.

11. The mobile electronic device of claim 10, wherein the predefined reduction pattern further defines each parsed text element to include a first vowel of the corresponding word or a vowel of a tonic syllable of the corresponding word.

12. The mobile electronic device of claim 9 wherein the text parser is further configured to provide to the display component indications of the parsed text elements of the sequence.

13. The mobile electronic device of claim 12, wherein the indications of the parsed text elements of the sequence comprise colors of a color coding scheme.

14. The mobile electronic device of claim 13, wherein the color coding scheme assigns colors to the parsed text elements, each parsed text element assigned a color of the color coding scheme corresponding to the determined probability that the parsed text element corresponds to the word.

15. The mobile electronic device of claim 9 wherein the phrase selector is configured to provide to the display component a single phrase of the plurality of phrases having a highest probability among the set of phrase probabilities.

16. The mobile electronic device of claim 15 wherein the phrase selector is configured to provide to the display component a predetermined number of the plurality of phrases corresponding to the phrases having the highest probabilities among the set of phrase probabilities.

17. A computer program product comprising a computer-readable memory device having computer program logic recorded thereon that when executed by at least one processor of a computing device causes the at least one processor to perform operations, the operations comprising:
receiving reduced text comprising a plurality of reduced text elements at an electronic device;
parsing the reduced text according to a predefined reduction pattern to generate a sequence of parsed text elements each corresponding to a respective one of the plurality of reduced text elements;
determining sets of word probabilities corresponding to the sequence by determining for each parsed text element of the sequence a corresponding set of word probabilities, each word probability of a set of word probabilities being a probability that the corresponding parsed text element is a reduced text representation of a respective word;
determining, based on the sets of word probabilities, a set of phrase probabilities corresponding to a plurality of phrases, each phrase probability of the set of phrase probabilities being a probability that the reduced text is a reduced text representation of a respective phrase of the phrases; and
providing at a user interface of the electronic device at least one of the phrases.

18. The computer program product of claim 17, wherein the predefined reduction pattern defines each parsed text element to include at least one of a predetermined number of initial letters of a corresponding word or a predetermined number of final letters of the corresponding word.

19. The computer program product of claim 18, wherein the predefined reduction pattern further defines each parsed text element to include a first vowel of the corresponding word or a vowel of a tonic syllable of the corresponding word.

20. The computer program product of claim 17, further comprising:
providing on the user interface of the electronic device a single phrase of the plurality of phrases having a highest probability among the set of phrase probabilities.

* * * * *